United States Patent [19]
Tou et al.

[11] Patent Number: 5,528,743
[45] Date of Patent: Jun. 18, 1996

[54] METHOD AND APPARATUS FOR INSERTING TEXT ON A PEN-BASED COMPUTER SYSTEM

[75] Inventors: Frederich N. Tou, Cupertino; Stephen P. Capps, San Carlos, both of Calif.

[73] Assignee: Apple Computer, Inc., Cupertino, Calif.

[21] Appl. No.: 180,846

[22] Filed: Jan. 12, 1994

Related U.S. Application Data

[63] Continuation-in-part of Ser. No. 70,096, May 27, 1993, Pat. No. 5,479,596.

[51] Int. Cl.$^6$ .............................. G06T 7/00; G06F 17/24
[52] U.S. Cl. .................... 395/148; 364/419.17; 382/181; 382/182; 382/292; 345/179; 395/146
[58] Field of Search ..................................... 395/144, 146, 395/148–151; 382/22, 30, 61, 173, 176–179, 181–182, 292; 364/419.17; 345/179

[56] References Cited

U.S. PATENT DOCUMENTS

| | | | |
|---|---|---|---|
| 4,812,832 | 3/1989 | Oishi et al. | 400/83 |
| 5,157,737 | 10/1992 | Sklarew | 382/13 |
| 5,220,649 | 6/1993 | Forcier | 395/148 |
| 5,231,698 | 7/1993 | Forcier | 395/146 |
| 5,237,651 | 8/1993 | Randall | 395/148 |

OTHER PUBLICATIONS

O'Connor, Rory J., "Apple Banking on Newton's Brain", Apr. 22, 1992, San Jose Mercury News.
Weinman, Liza and Moran, Tom, "A Step Toward the Future", Aug. 1992, Macworld Magazine.
Soviero, Marcelle M., "Your World According to Newton", Sep. 1992, Popular Science Magazine.
Abatemarco, Fred, "From the Editor", Sep. 1992, Popular Science Magazine.
Macintosh User's Guide, 1991.

*Primary Examiner*—Heather R. Herndon
*Assistant Examiner*—Joseph H. Feild
*Attorney, Agent, or Firm*—Hickman Beyer & Weaver

[57] ABSTRACT

A method and apparatus in accordance with the present invention comprises the process and means for receiving input strokes made with a stylus on a screen of a pen-based computer and determining if the strokes comprise a text object. When the strokes do form a text object, a rating for each existing displayed paragraph is assigned to identify a probability level that an insert location is within the paragraph. Determining a rating involves comparing the bounds of the text object to extended bounds of the existing paragraph, and the input strokes of the text object to the input strokes of the preceding text object. When the rating is completed for each paragraph, an insert location within the highest rated or most probable existing paragraph is then identified, and the text object is inserted at this insert location. A new paragraph is formed with the text object at a location based on the input strokes when a most probable paragraph is not identified.

37 Claims, 7 Drawing Sheets

151 ⭨ one two three four fi̵v̵e̵ s̵i̵x̵
seven eight nine ten ~~eleven~~

*Figure 6a* one two three four five six
seven eight nine ten eleven

*Figure 6b* one ~~two~~ three

*Figure 6c* one two three

*Figure 6d* one two three

*Figure 6e*

169 ⭨ one two four

*Figure 6f* one two ~~three~~

*Figure 6g* one two three four

*Figure 6h*

METHOD AND APPARATUS FOR INSERTING TEXT ON A PEN-BASED COMPUTER SYSTEM

CROSS-REFERENCE TO RELATED APPLICATIONS

This application is a continuation-in-part of U.S. patent application Ser. No. 08/070,096 filed May 27, 1993, U.S. Pat. No. 5,479,596 on behalf of Capps, et. al., and entitled *Method and Apparatus for Formatting Paragraphs,* which is assigned to the assignee of the present invention, and the disclosure of which is incorporated herein by reference in its entirety.

BACKGROUND OF THE INVENTION

The present invention relates generally to computer systems, and more particularly to inserting text objects in a pen-based computer system.

Computerized personal organizers are becoming increasingly popular with a large segment of the population. Computerized personal organizers tend to be small, lightweight, and relatively inexpensive, and can perform such functions as keeping a calendar, an address book, a to-do list, etc. While many of these functions can also be provided in conventional computer systems, personal organizers are very well suited to the personal organization task due to their small size and portability. Personal organizers are available from such companies as Sharp and Casio of Japan.

A relatively new form of computer, the pen-based computer system, holds forth the promise of a union between the power of a general purpose computer and the functionality and small size of a personal organizer. A pen-based computer system is typically a small, hand-held computer where the primary method for inputting data includes a "pen" or stylus. A pen-based computer system is commonly housed in a generally rectangular enclosure, and has a dual-function display assembly providing a viewing screen along one of the planar sides of the enclosure. The dual-function display assembly serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad. For example, graphical images can be input into the pen-based computer by merely moving the stylus on the surface of the screen. As the CPU senses the position and movement of the stylus, it generates a corresponding image on the screen to create the illusion that the stylus is drawing the image directly upon the screen, i.e., that the stylus is "inking" an image on the screen. With suitable recognition software, text and numeric information can also be entered into the pen-based computer system in a similar fashion.

Pen-based systems are limited in their ability to perform word processing as efficiently as keyboard-based systems. Unlike keyboard-based systems in which typing in data is simple and convenient, pen-based systems are restricted to inputting text by using the stylus, which although simple, is not as convenient as typing for accurate, extended textual entry into the computer system. However, some of the basic word processing functions can be achieved on a pen-based system to aid in making text entry into a pen-based system more convenient. One such technique is the insertion of new text into already existing text. In keyboard-based systems, insertions are performed by locating an insertion point and then continuing with the typing of the new text. No existing text is overwritten by the new text, and all the characteristics, such as margin, font, justification, etc., that are established for that portion of the document within the processing program are maintained for the newly entered data. What is needed is a method for achieving such insertions on a pen-based system.

SUMMARY OF THE INVENTION

In accordance with the purpose of the present invention, a method and apparatus for inserting text on a pen-based computer system is described. In general, insertions can be performed easily and accurately.

A method in accordance with the present invention for inserting text includes the step of identifying strokes input with a stylus onto a screen of a pen-based computer system as a text object. Each existing displayed paragraph is then examined to determine whether an association exists between the text object and the paragraph, and then a rating of probability that the insert location lies within the paragraph is assigned when an association does exist. The ratings of the paragraphs are then compared and the highest rated paragraph is identified if the text object is associated with one or more of the paragraphs. The insert location is then identified within the highest rated paragraph. When the insertion is not within an already existing paragraph, the insert location is based on the location of the input strokes forming the text object to create a new paragraph with the text object.

A further method in accordance with the present invention comprises determining whether a best-matched paragraph exists for insertion of a text object input on a screen of a pen-based computer. When there is a best-matched paragraph, a line within the paragraph is identified as the insert location, and the insert location is based on the position of the input text object. When the text object overlies open space within the identified line, the insert location is a space, but when not over open space, the insert location is based on an existing word. A new paragraph is formed with the text object at a location based on the input strokes when there is no best-matched paragraph established. Following the insertion, the screen display is updated to include the text object.

An apparatus for achieving the methods of the present invention includes mechanisms for receiving and identifying strokes input on a screen of a pen-based computer system as a text object. The apparatus further includes a mechanism for rating each displayed existing paragraph with a probability level to characterize the association existing between the text object and each paragraph. A mechanism for determining an insert location identifies an insert location within an existing paragraph when an association does exist or as a new paragraph when no association exists. The text object is then inserted at the identified insert location by a mechanism for insertion.

By the methods and apparatus of the present invention, a practical and accurate text insertion technique for pen-based computer systems is achieved. Further, text can be easily inserted into existing text or established as new text. Also, successive text entries are appropriately inserted in order of entry into the same text object, providing similarity to typed entry on a keyboard-based system.

These and other advantages of the present invention will become apparent upon reading the following detailed descriptions and studying the various figures of the drawings.

BRIEF DESCRIPTION OF THE DRAWINGS

FIGS. 6a–b illustrate the inked input and subsequent insertion of a word at the end of a paragraph;

FIGS. 6c–6e illustrate the input of a word into an open space of a paragraph and the subsequent insertion of the word into the paragraph; and FIGS. 6f–6h illustrate the input of a word between words in a paragraph and the subsequent insertion of the word into the paragraph.

DETAILED DESCRIPTION OF THE PREFERRED EMBODIMENTS

The present invention is well suited for pointer based computer systems such as the pen-based, pen-aware and mouse controlled systems that are currently popular. For the purposes of illustration, the invention will be described in connection with a pen-based system.

Figure 1:
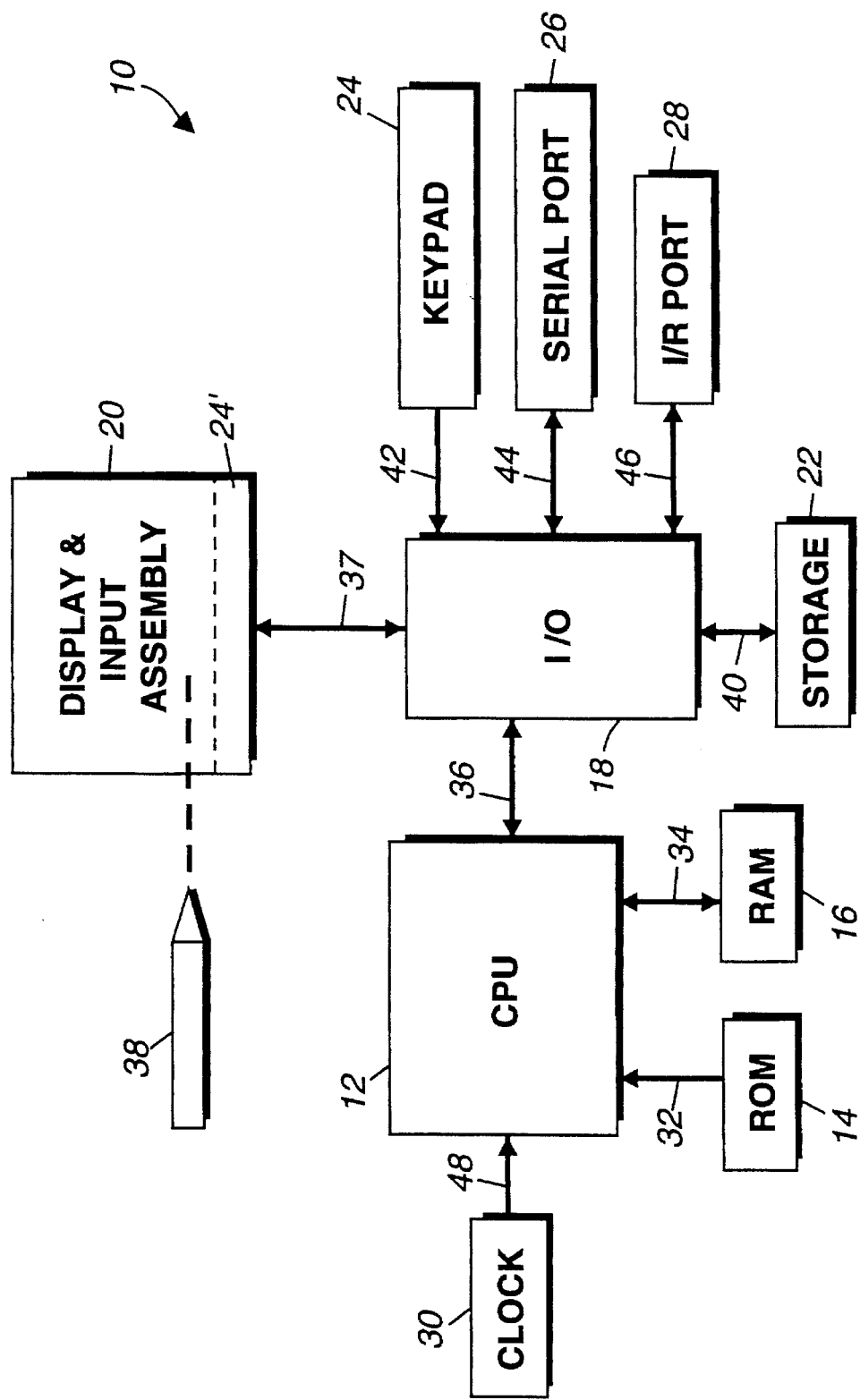
FIG. 1 is a block diagram of a computer system in accordance with the present invention.

As shown in FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22, a keypad (or keyboard) 24, a serial port 26, an infrared (I/R) port 28, and a clock 30.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a unidirectional data bus 32. ROM 14 preferably contains the basic operating system for the pen-based computer system 10. CPU 12 is connected to RAM 16 by a bi-directional data bus 34 to permit the use of RAM 16 as scratch pad memory. ROM 14 and RAM 16 are also coupled to CPU 12 by appropriate control and address busses, as is well known to those skilled in the art. CPU 12 is coupled to the I/O circuitry 18 by bi-directional data bus 36 to permit data transfers with peripheral devices.

I/O circuitry 18 preferably includes a number of latches, registers and direct memory access (DMA) controllers. The purpose of I/O circuitry 18 is to provide an interface between CPU 12 and such peripheral devices as display assembly 20, mass storage 22, keypad 24, serial port 26, and I/R port 28.

Display assembly 20 of pen-based computer system 10 is both an input and an output device. Accordingly, it is coupled to I/O circuitry 18 by a bi-directional data bus 37. When operating as an output device, the display assembly 20 receives data from I/O circuitry 18 via bus 37 and displays that data on a suitable screen. The screen for display assembly 20 is preferably a liquid crystal display (LCD) of the type commercially available from a variety of vendors. The input device of display assembly 20 is preferably a thin, clear membrane that covers the LCD display and that is sensitive to the position of a stylus 38 on its surface. With such a structure, the membrane of the display assembly 20 can serve as an input "tablet." These position sensitive membranes are also readily available on the commercial market. Alternatively, other types of tablets can be used, such as inductively coupled tablets. Combination display assemblies such as display assembly 20 that include both the LCD and the input membrane are commercially available from such vendors as Scriptel Corporation of Columbus, Ohio.

Some type of mass storage 22 is generally considered desirable. Mass storage 22 can be coupled to I/O circuitry 18 by a bi-directional data bus 40. However, the mass storage 22 can be eliminated by providing a sufficient amount of RAM 16 to store user application programs and data. In that case, the RAM 16 can be provided with a backup battery to prevent the loss of data even when the pen-based computer system 10 is turned off. However, it is generally desirable to have some type of long term mass storage 22 such as a commercially available miniature hard disk drive, nonvolatile memory such as flash memory, battery backed RAM, a PCMCIA card, or the like.

Figure 2:
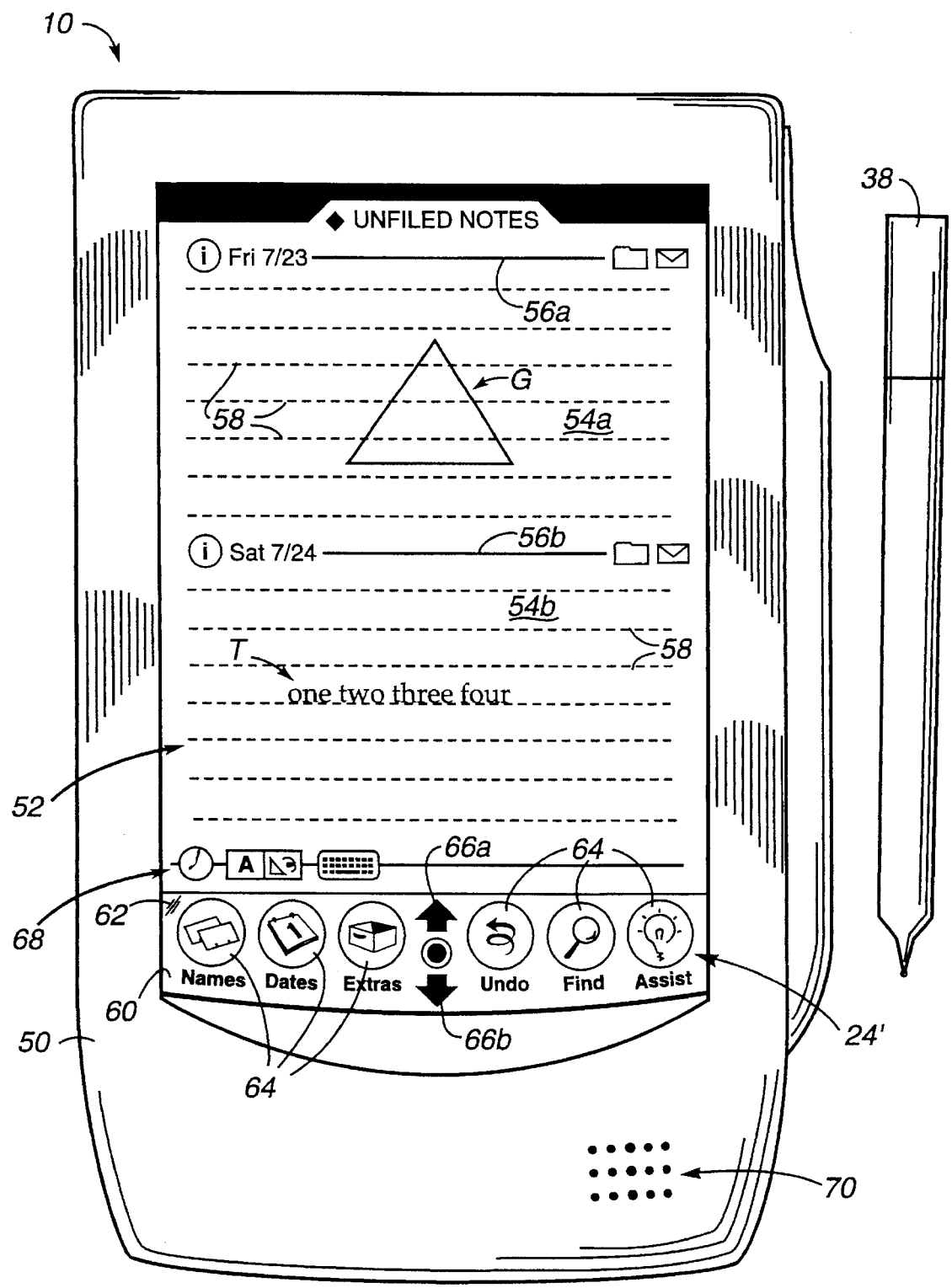
FIG. 2 is a top plan view of the screen, case, keypad, and stylus of the computer system of FIG. 1 with an illustration of text insertion.

The keypad 24 can comprise an array of mechanical buttons or switches coupled to I/O circuitry 18 by a data bus 42. Alternatively, keypad 24 can comprise an entire, standard QWERTY keyboard. In the present embodiment, a separate keypad 24 is not used in favor of a "pseudo" keypad 24'. This "pseudo" keypad 24' comprises "button" areas which are associated with a bottom edge of the tablet membrane that extends beyond the lower edge of the LCD display. These button areas are defined by printed or silk-screened icons which can be seen through the transparent membrane of the input tablet. When the "buttons" are selected by engaging the stylus 38 with the membrane over these printed icons, the membrane senses the pressure and communicates that fact to the CPU 12 via data bus 37 and I/O 18. An example of pseudo keypad 24' is shown in FIG. 2.

Other types of pointing devices can also be used in conjunction with the present invention. While the method of the present invention is described in the context of a pen-based system, other pointing devices such as a computer mouse, a track ball, or a tablet can be used to manipulate a pointer on a screen of a general purpose computer. Therefore, as used herein, the terms "pointer", "pointing device", "pointing means", and the like will refer to any mechanism or device for pointing to a particular location on a screen of a computer display.

Serial port 26 is coupled to I/O circuitry by a bi-directional bus 44. The serial port 26 can be used to couple the CPU to external devices and networks.

Infrared (I/R) port 28 is coupled to I/O circuitry by a bi-directional bus 46. The I/R port can be used for outgoing information (e.g., to control a printer or some other external device, or to communicate with other computer systems) or for incoming information from other computers or devices.

Clock 30 preferably comprises a real-time clock to provide real-time information to the system 10. Alternatively, clock 30 can simply provide regular clock pulses to, for example, an interrupt port of the CPU 12 which can count the clock pulses to provide the time function. However, this alternative clock embodiment tends to be wasteful of CPU processing power. Clock 30 is coupled to CPU 12 by a data bus 48.

In operation, information is input into the pen-based computer system 10 by "writing" on the screen of display assembly 20 with the stylus 38. Information concerning the location of the stylus 38 on the screen of the display assembly 20 is input into the CPU 12 via data bus 37 and I/O circuitry 18. Typically, this information comprises the Cartesian (i.e., x & y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system and possibly an application program stored in ROM 14, RAM 16, or mass storage 22. The CPU 12 next produces data which is transferred to the display assembly 20 via I/O circuitry 18 and data bus 37 to produce appropriate images on the screen portion of the display assembly 20.

In FIG. 2, the pen-based computer system 10 of FIG. 1 is shown housed within a generally rectangular enclosure 50. The CPU 12, ROM 14, RAM 16, I/O circuitry 18, and clock 26 are preferably fully enclosed within the enclosure 50. The display assembly 20 (FIG. 1) is mostly enclosed within the enclosure 50, but a viewing screen 52 of the display assembly is exposed to the user. As used herein, the term "screen" will refer to the portion of the display assembly 20 which can display an image that can be viewed by a user. Also accessible to the user is the pseudo keypad 24' that was described with reference to FIG. 1.

Upon power-up, pen based computer system 10 displays on screen 52 an initial "note" area 54a including a header bar 56a and a number of guidelines 58. The header bar 56a preferably includes the date of creation of the note area 54a and a number of icons and "soft" buttons, not particularly germane to the discussion of the present invention. For this reason, the header bar 56a will not be discussed in detail herein. The optional guidelines 58 aid a user in entering text, graphics, and data into the pen-based computer system 10. A graphic object G in the form of a triangle is shown entered within note area 54a.

Additional note areas, such as a note area 54b, can be formed by the user by drawing a substantially horizontal line across the screen 52 with the stylus 38. The substantially horizontal line is recognized by the system 10 and is converted into a second header bar 56b. Additional text, graphical, and other data can then be entered into this second note area 54b.

In this preferred embodiment, the keypad 24', as explained previously, comprises a printed or silk-screened member 60 provided beneath a lower edge of a thin, clear, stylus-sensitive membrane 62 of the input "tablet." Alternatively, a keypad could comprise a mechanical keypad (or keyboard) 24, or a keypad could comprise "soft buttons", i.e., images generated at convenient locations on the screen 52, in which case a "button" would be activated by touching the stylus to the screen over the image of the button. The keypad 24' preferably includes a number of dedicated function buttons 64 and a pair of scroll buttons 66a and 66b. The operation of the note areas 54a, 54b, etc., scroll buttons 66a and 66b, and other aspects of computer system 10 are discussed in greater detail in U.S. patent application Ser. No. 07/868,013, filed Apr. 13, 1992, now U.S. Pat. No. 5,398,310, issued Mar. 14, 1995, on behalf of Tchao et al., assigned to the assignee of the present invention and incorporated herein by reference in its entirety.

The screen illustrated in FIG. 2 is referred to as the "notepad", and is preferably an application program running under the operating system of the pen based computer system 10. In this preferred embodiment, the notepad is a special or "base" application which is always available beneath higher level applications. The notepad application, like other applications, runs within a window, which in this instance comprises the entire viewing screen 52. Therefore, as used herein, a "window" is the entire screen or any portion of an entire screen which is dedicated to a particular application program.

A status bar 68 is provided at the bottom of the notepad application. The status bar 68 is provided with a number of active and display areas, which again are not particularly germane to the present invention and will therefore not be discussed in detail herein. U.S. patent application Ser. No. 07/976,970 filed Nov. 16, 1992, which is now U.S. patent application Ser. No. 08/393,880, on behalf of Foster et. al, entitled "Status Bar for Application Windows" and assigned to the assignee of the present invention describes how to make and use the status bar, and is incorporated herein by reference in its entirety.

The enclosure 50 is preferably provided with apertures 70 which permit the free transmission of sound from a speaker (not shown) which is housed within enclosure 50. The speaker can be driven by the CPU 12, by I/O circuitry 18, or by specialized sound chips, as is well known to those skilled in the art. The speaker can be used to provide user feed-back, or to transmit audible information to a user.

The term "object" will be used extensively in the following discussions. As is well known to software developers, an "object" is a logical software unit comprising data and processes which give it capabilities and attributes. For example, an object can be queried as to its type and can return such data as the number of words that it contains, what its bounding box (BBOX) is, etc. Objects can contain other objects of the same or of a different type. Objects can also be used to project images on a screen according to their object type. Examples of object types used in the following description include paragraph, line, and word objects. There are many well known texts that describe object oriented programming. See, for example, *Object Oriented Programming for the Macintosh*, by Kurt J. Schmucker, Hayden Book Company, 1986.

In the present invention, objects are preferably implemented as part of a frame system that comprises frame objects related by a semantic network. A description of semantic networks can be found in "A Fundamental Tradeoff in Knowledge Representation and Reasoning", *Readings in Knowledge Representation,* by Brachman and Leveseque, Morgan Kaufman, San Mateo, 1985.

It will be noted there is a liberal use of graphic elements in the present invention. For example, the header bars 56a and 56b include lines and other graphical elements. Processes for drawing lines on a computer screen are well known to those skilled in the art. For example, graphics software such as QUICKDRAW from Apple Computer, Inc. of Cupertino, Calif. can be used to draw lines, simple geometrical shapes, etc. A description of the QUICKDRAW graphics software is found in the book *Inside Macintosh, Volumes I, II, and III*, by C. Rose et al., Addison-Wesley Publishing Company, Inc., July 1988. With such graphics software, a line can be drawn by simply specifying the coordinates of the beginning and the end of the line, and by specifying the width of the line.

Another preferred tool for implementing the system of the present invention is a view system. Various types of view systems are well known to those skilled in the art. In the present system, the notepad application on the screen 52 forms a first or "root" layer, with the status bar 68, for example, positioned in a second layer "over" the root layer. The various buttons of the status bar 68 are positioned in a third layer "over" the second and root layers. The view system automatically handles "taps" and other gestures of the stylus 38 on the screen 52 by returning information concerning the tap or gesture and any object to which it may be related. Again, the status bar 68 and the view system is described in greater detail in co-pending U.S. patent application Ser. No. 07/976,970, which is now U.S. patent application Ser. No. 08/393,880, which has been incorporated herein by reference.

The object oriented programming and view system software makes the implementation of the processes of the present invention less cumbersome than traditional programming techniques. However, the processes of the present invention can also be implemented in alternative fashions, as will be well appreciated by those skilled in the art.

As illustrated in FIG. 2, a paragraph T comprises the recognized words "one two three four" which had been input on screen 52 into note area 54b using stylus 38. A suitable recognition engine for use in conjunction with this invention is described in copending U.S. patent application Ser. No. 08/068,443 filed on May 27, 1993, abandoned, now U.S. patent application Ser. No. 08/265,497 on behalf of Beernink, entitled "Method and Apparatus for Recognizing Handwritten Words", assigned to the assignee of the present invention, and incorporated herein by reference in its entirety. However, it should be appreciated that the actual recognition engine used may be varied widely without significantly affecting the advantages of the present invention. The arrangement of the words in paragraph T upon recognition is determined by the methods in accordance with the present invention set forth in greater detail with reference to FIGS. 4–6. In part, the insertion of each word into paragraph T is dependent upon the proximity in both time and space of each input word to the preceding input word. As shown in FIG. 2, the input of each of the words "one" to "four" has met the criteria for insertion within the paragraph T. This accurately reflects that each word was entered one after another and was intended to be a part of the same paragraph.

Figure 3A:
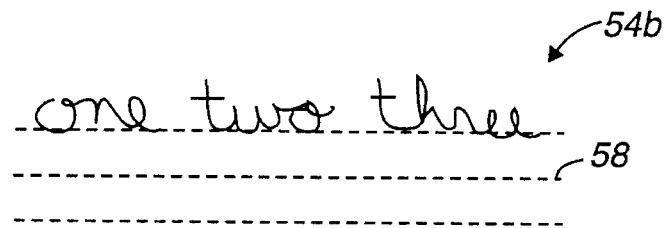
FIGS. 3a–3e illustrate representative screen inputs and displays made on the apparatus of FIG. 2 that illustrate stroked text entry and insertion.
Figure 3B:
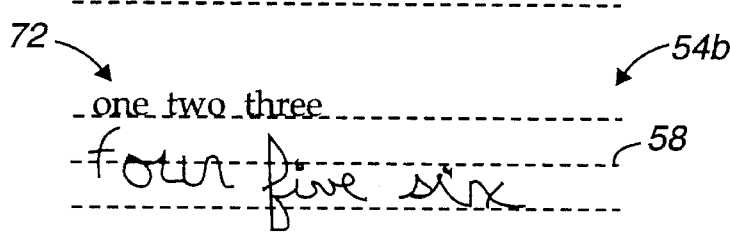
Figure 3C:
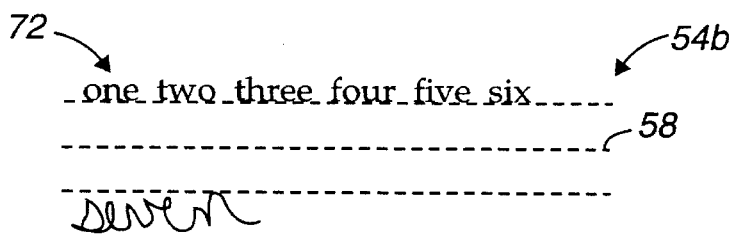
Figure 3D:
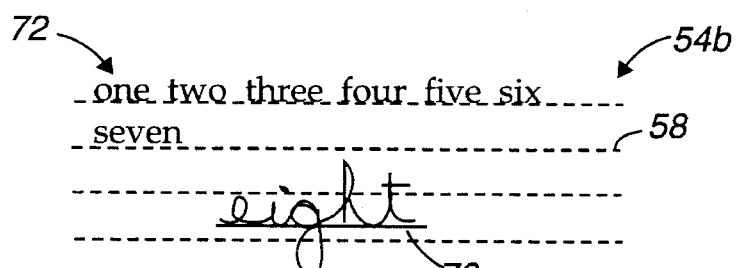
Figure 3E:
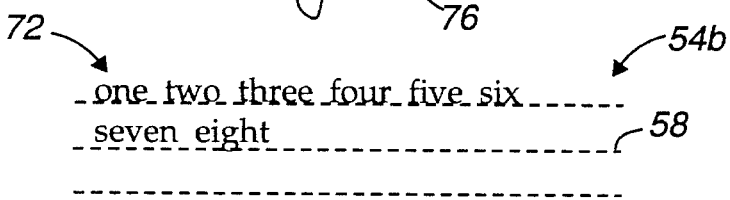
Figure 3F:
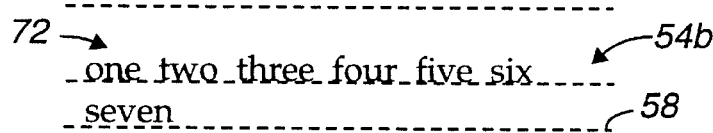
FIGS. 3f–3g illustrate alternate insertions of the input of FIG. 3d.

FIGS. 3a–3g illustrate partial screen views of screen 52 and note area 54b with FIG. 3a to FIG. 3e showing step by step views of the insertion of words entered consecutively onto screen 52. In FIG. 3a, the inked strokes for the words "one two three" have been input by using the stylus 38 to contact the screen 52 and subsequently moving the stylus 38 across the screen 52. FIG. 3b illustrates the resultant paragraph 72 comprising the recognized words "one two three". The inked strokes for the words "four five six" are also shown in FIG. 3b, and when the criteria for insertion have been met, the recognized words "four five six", resulting from the inked strokes as shown in FIG. 3b, are inserted into paragraph 72 as illustrated in FIG. 3c. Similarly, the input of the inked strokes for the word "seven", as shown in FIG. 3c, result in the insertion of recognized word "seven" into paragraph 72, which is illustrated in FIG. 3d. Also illustrated in FIG. 3d are the inked strokes for the word "eight". When the input of these inked strokes meets the criteria for insertion, the recognized word "eight" is inserted into paragraph 72 as shown in FIG. 3e. However, when the inked strokes for the word "eight" have been entered a sufficient time and distance from the paragraph 72, the recognized word "eight" is not inserted in paragraph 72. Rather, a new paragraph 74 is begun with the recognized word "eight", with the location of new paragraph 74 based in part on the presence of guidelines 58, so that new paragraph 74 is inserted as shown in either FIG. 3f or FIG. 3g. The identification and location of inserting a new paragraph, as well as inserting within a paragraph, are detailed in the methods of the present invention as set forth in the following description with reference to FIGS. 4–6.

Figure 4:
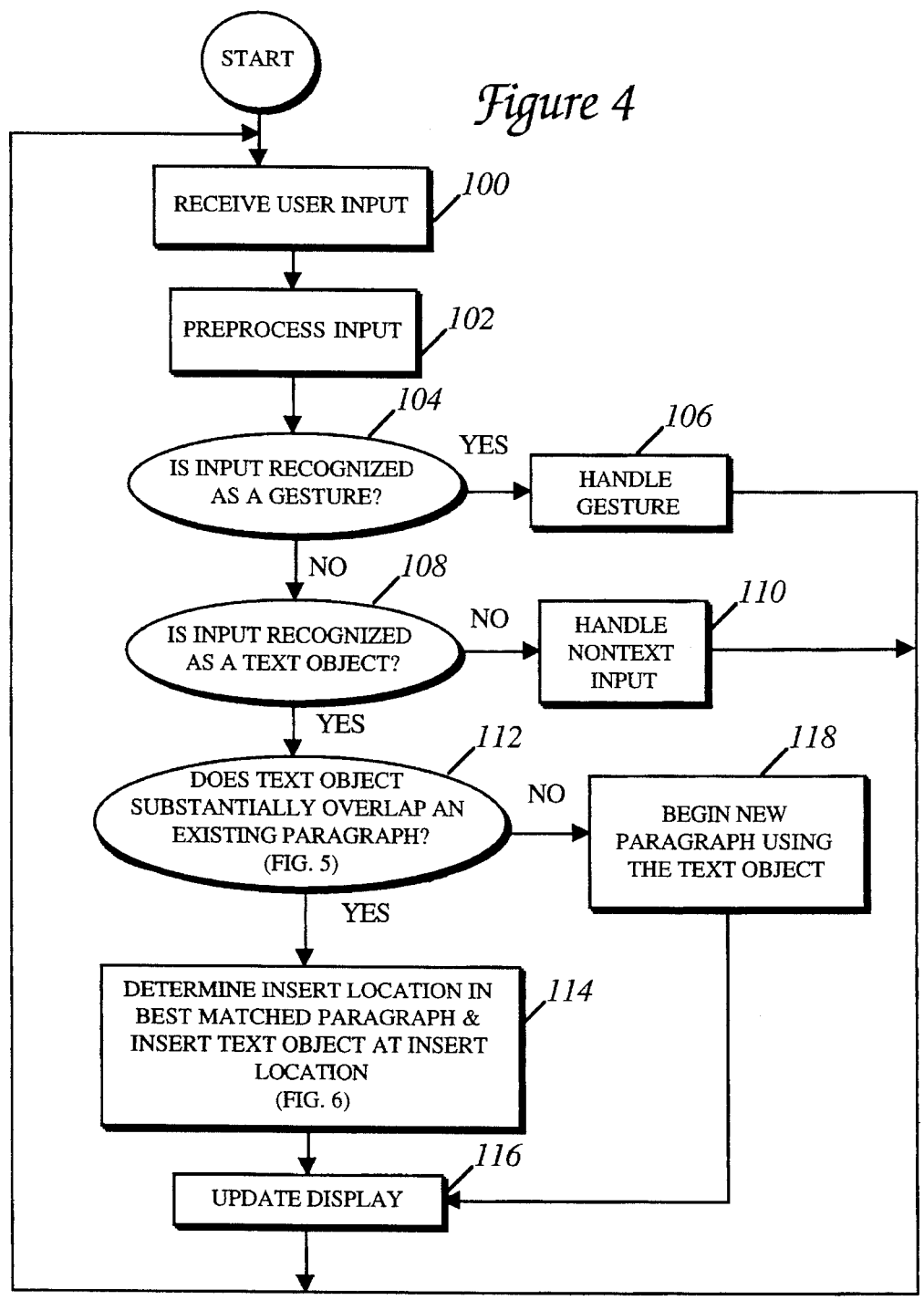
FIG. 4 is a flow diagram of an overall text insertion process in accordance with the present invention.

The flow diagram of FIG. 4 illustrates the steps in the overall process for inserting text in accordance with the present invention. The process begins in step 100 when data is input to the system by a user engaging the stylus with the screen and then possibly moving the stylus across the screen. The input is then preprocessed in step 102 by the system to group together any input strokes appropriately in a point-to-point or "connect the dot"fashion so that the strokes can then be identified as a text object, gesture, graphical object, etc., in subsequent processing. Once the strokes have been preprocessed, the logic continues with step 104 with the determination of whether the input has been recognized as a gesture. If so, the gesture is handled appropriately in step 106. By way of example, the gesture may be a delete gesture, a new selection gesture, a gesture inserting space between objects displayed on the screen, a gesture changing the case of recognized textual materials and/or a wide variety of other application specific gestures. Of course a wide variety of gestures could be considered and the order that they are investigated is not relevant to the present invention. Following the handling of a gesture in step 106, the process returns to step 100 to wait for the next user input.

When the input has not been recognized as a gesture, the process continues with step 108 to determine if the input has been recognized as a text object. Again, a suitable recognition engine is disclosed in the aforementioned co-pending U.S. patent application Ser. No. 08/068,443, but, it should be appreciated that the actual recognition engine used may be varied widely without significantly affecting the advantages of the present invention. If the input is not a text object, the input is handled appropriately by the system as a nontext input in step 110. By way of example, if the input is a graphical object, it is displayed on the screen, such as the graphic object G in FIG. 2. Following step 110, the process returns to step 100 to wait for the next user input.

When the input is recognized as a text object, the location of insertion for the text object is determined. Step 112 determines whether an existing paragraph is substantially overlapped. The details of determining substantial overlap are given with reference to FIG. 5. Once an existing paragraph has been identified for insertion, the process continues with step 114 to determine a location within the existing paragraph for insertion and to insert the text object at that insert location. The steps involved in this determination are presented in greater detail with reference to FIG. 6. With the insertion location identified and the insertion completed, the display screen is updated in step 116 to include the text object inserted into the appropriate paragraph at the insert location. Step 116 is described in greater detail in the process illustrated in FIG. 6. In general, when the insert location is located at the end of the paragraph, the text object is merely appended to the appropriate paragraph. When the insert location is determined to be in the middle of a paragraph, the paragraph will be reflowed, such as that illustrated in FIGS. 6*f*–6*h*. The process for insertion is then completed, and the logic returns to step 100 to wait for the next user input.

Figure 3G:
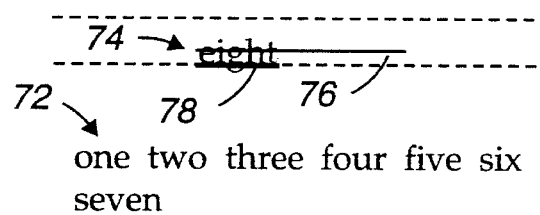

When an existing paragraph has not been identified as the insert location, i.e., step 112 is negative, a new paragraph is begun with the text object in step 118. The location for the insertion of the new paragraph is based upon the location of the input of the inked strokes that comprise the text object. The text object's baseline is located at the baseline location of the input strokes, and the left edge of the input strokes is the corresponding position for the left edge of the text object. When guidelines 58 (see FIG. 2) are present, the baseline of the new paragraph is positioned or "snapped" to the nearest guideline with a bias of snapping down. Of course, when the baseline falls within a few pixels of a guideline, the baseline of the new paragraph is positioned at that guideline regardless of whether the guideline is slightly above or below the baseline. As an example of the positioning of text when guidelines are present, the recognized word "eight" in FIG. 3*f* has been positioned so that the baseline 78 of the recognized word lies on the nearest guideline, with the left edge of the recognized word "eight" positioned at the same location as the left edge of the inked strokes. When the guidelines are not present, as shown in FIG. 3*g*, the recognized word "eight" is positioned with the same left edge location, but its baseline 78 location is the same as the baseline location 76 (see FIG. 3*d*) of the inked strokes. Although the baselines 76 and 78 have been shown in FIGS. 3*d*, 3*f*, and 3*g*, it is done for illustrative purposes only, and in actual practice, the baseline is an internal line that would not be visible on the screen. Once the location for insertion of the new paragraph comprising the input text object has been established, the process continues with the updating of the display screen to include the new paragraph in step 116 before returning to step 100 to wait for the next user input.

Figure 5:
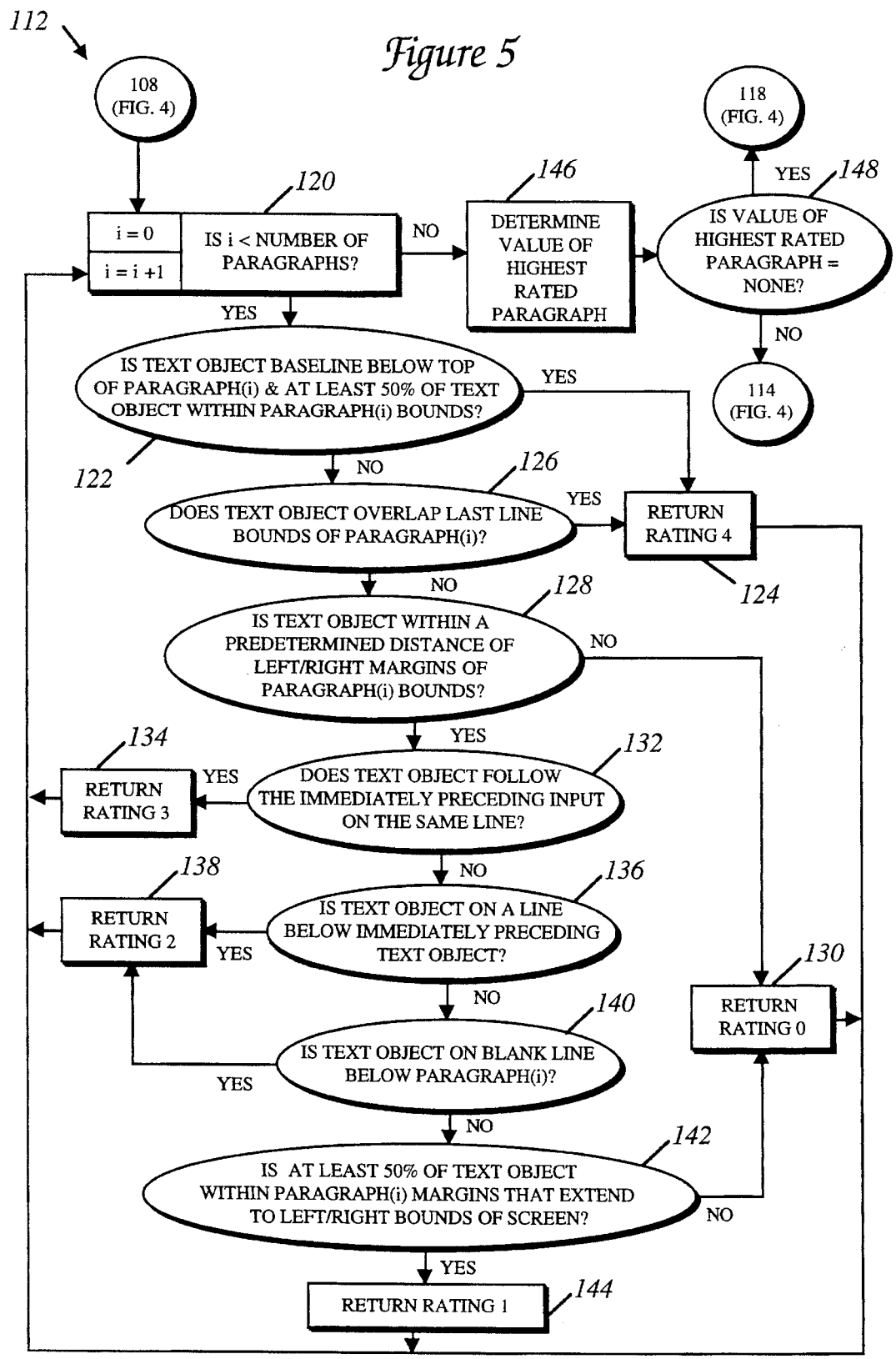
FIG. 5 is a flow diagram of a suitable process for determining whether an insertion location lies within an already existing paragraph (step 112 of FIG. 4)

In FIG. 5, the process of determining whether an insertion location lies within an already existing paragraph is illustrated (step 112 of FIG. 4). A counter "i" is initialized at the beginning of step 120 and is compared to the number of paragraphs that are displayed on the screen. As long as the value in counter "i" is below the number of displayed paragraphs, the logic proceeds to step 122. The rating process begins in step 122 with an initial comparison of the text object's baseline with the bounds of an existing paragraph [paragraph (i)]. If the baseline is located below the top of the paragraph (i), i.e., below the top of the paragraph bounding box, and at least half of the text object lies within the paragraph bounds, then a rating of "four" is given to that paragraph in step 124. When determining overlap, the location of the bounding box of the text object is compared to the location of the bounding box of the existing paragraph. If at least 50 percent of the text object's bounding box is within the paragraph's bounds, then substantial overlap is assumed. The rating of "four" indicates that there is a high probability that the paragraph being tested is the correct paragraph for insertion of the text object. After the rating has been given, the logic returns to step 120 where the counter "i" is incremented and the value of "i" is once again compared to the number of displayed paragraphs. The loop formed is then repeated until each of the paragraphs has been rated at which time the value of counter "i" will equal the number of paragraphs causing the test in step 120 to fail.

When the determination in step 122 is negative, the logic moves to step 126 which determines whether the text object in any way overlaps the last line of paragraph "i". Again, the actual test determines whether the text object overlaps anything within the bounds of the last line's bounding box. If the text object in any way overlaps the last line of text, then the logic again proceeds to step 124 where a rating of "four" is assigned to that paragraph to indicate that the insert location is most likely within that paragraph. More specifically, in this circumstance, the interpretation would be that the text object is intended for the end of the last line of the paragraph. After the rating has been assigned, the logic returns to step 120 where counter "i" is incremented.

If the result of step 126 is the determination that the text object does not overlap the last line of paragraph "i", then the logic for designating a rating continues to step 128 which determines whether the text object lies within a predetermined distance of the left and right margins of paragraph(i). This step effectively determines whether the insert has been placed close to the current paragraph. If the result is no, then it is assumed that the input is definitely not intended as an addition to the current paragraph and a rating of "zero" is returned in step 130. The logic then returns to step 120 to increment the counter "i". Although the actual length of the predetermined distance used in step 128 may be varied in accordance with the needs of a particular application, in the described handheld personal communicator embodiment, a distance of ten pixels beyond the right and left bounds of the paragraph has been found to work well as the predetermined distance. It should be appreciated that the effect of step 128 is to determine whether any portion of the text object overlaps a bounding box whose left and right margins are pushed out by the predetermined distance from the paragraph's actual bounding box. If a portion of the text object does lie within this area, the logic proceeds to step 132.

Step 132 determines if the text object has been input substantially immediately following the input of the previous text object on the same line. By way of example, the input of one text object approximately within 2 to 5 seconds after the input of another text object is appropriate for this determination, with 5 seconds having been found to be an appropriate amount of time between inputs to indicate that one text object substantially immediately follows another text object. The purpose of this determination is to allow the grouping of text into the same paragraph as the text is input a word at a time. In this step, the location of the ink of the text input is used to determine if the objects have been input on the same line. This is done by checking for the placement of the text input to the right of a preceding text input, for slight overlap, e.g., 5 pixels, between the last input strokes of the preceding text input and the first input strokes of the text input, and for a same baseline, e.g., within 18 pixels, of the text inputs. Such similarities between text inputs indicate the text objects comprise single words in the same line of the same paragraph. If such a determination is made, a rating of "three" is assigned to the paragraph(i) in step 130 to indicate that there is a good probability that the insert location of the text object is within that paragraph. By way of example, FIG. 3*a* illustrates the inked input of the words "one two three". As shown, the words have been input within the designated time and lie on the same line, so that there is a good probability that the words are part of the same paragraph. The resultant positioning of the recognized words "one two three" in the same paragraph 72 is illustrated in FIG. 3b. Once the rating is assigned, the logic then returns to step 120 to increment the counter.

When the result of step 132 is negative, the process continues with step 136 to determine if the text object has been input on a line below and substantially immediately following in time the input of the preceding text object. Again, 5 seconds is an appropriate time limit for determining the immediateness of the text object's input. In contrast to the preceding step of determining if the text object is on the same line as the preceding text object, step 136 determines if the text object has been input on a line below the preceding text object. In this determination, the top edge of the text object's input strokes must fall within the bottom half of the preceding text object's input strokes or within an area immediately below. An appropriate area immediately below extends a distance from the bottom of the preceding text object's bounding box equal to the height of the bounding box that is the taller bounding box between the current and preceding text input plus an additional appropriate amount, such as ten pixels, to allow for interline spacing. When an overlap exists, there is a fair probability that the text object belongs in the paragraph being tested, and a rating of "two" is assigned to the paragraph in step 138 before the process returns to step 120. By way of example, in FIG. 3c, the recognized word "four" is placed into the same paragraph as the recognized "three" due to the input as seen in FIG. 3b of the strokes comprising "four" on the line below and substantially immediately after the input of the strokes comprising "three".

If the text object is not on a line below the immediately preceding input, then the process continues with step 140, which determines whether the area overlapped by the top of the text object includes the region that would be occupied by a blank line below the paragraph. An appropriate height for a blank line is the maximum value between the height of the last line of recognized text in the paragraph and the height of the preceding text object's input strokes. If the overlap exists, a rating of "two" is assigned to the paragraph in step 138 to indicate that there is a fair probability that the text object is associated with the paragraph. After the rating has been assigned, the logic again returns to step 120 which increments the counter "i".

If the text object is not on a blank line below the paragraph, then the process continues with step 142, which essentially determines whether the text object is substantially to the left or right of the active paragraph. More specifically, a determination is made whether at least half of the text object lies within bounds that are defined when the right and left margins of the paragraph are extended to the right and left edges of the screen. If so, the paragraph is given a rating of "one" in step 144 to indicate that there is a low probability that the insert location is within the paragraph. On the other hand, if at least 50 percent overlap is not detected in step 142, the logic moves to step 130 where a rating of "zero" is given. After the rating has been given in step 130 or 144, the logic returns to step 120 as described above. Once all the paragraphs have been rated, the logic proceeds to step 146.

In step 146, the ratings of the various paragraphs are compared and the value of the highest rated paragraph is determined. When all of the paragraphs have ratings of zero, the text object is not considered to be within any of the existing paragraphs, and a value of "NONE" will be returned in step 146. When the value returned in step 148 is "NONE", then a determination has been made that the text object is not over or adjacent any other text objects, and the logic returns to step 118. On the other hand, when the value returned in step 148 is not "NONE", a determination has been made that the appropriate insert position is within existing text. Accordingly, the process then continues to step 114 where the insert location within the best matched paragraph is identified. In the situation that an equal rating has been determined for two or more paragraphs, i.e., a "tie" exists between paragraphs, the selected paragraph for inserting the text object is the paragraph first rated. For example, if paragraph(0) and paragraph(1) were rated equally as 4, paragraph(O) would be the selected best matched paragraph. Of course, in alternate embodiments, different tie-breaking systems could be employed. Also, although a numerical rating system of one to four is used in the described process, other rating systems could be employed.

Figure 6:
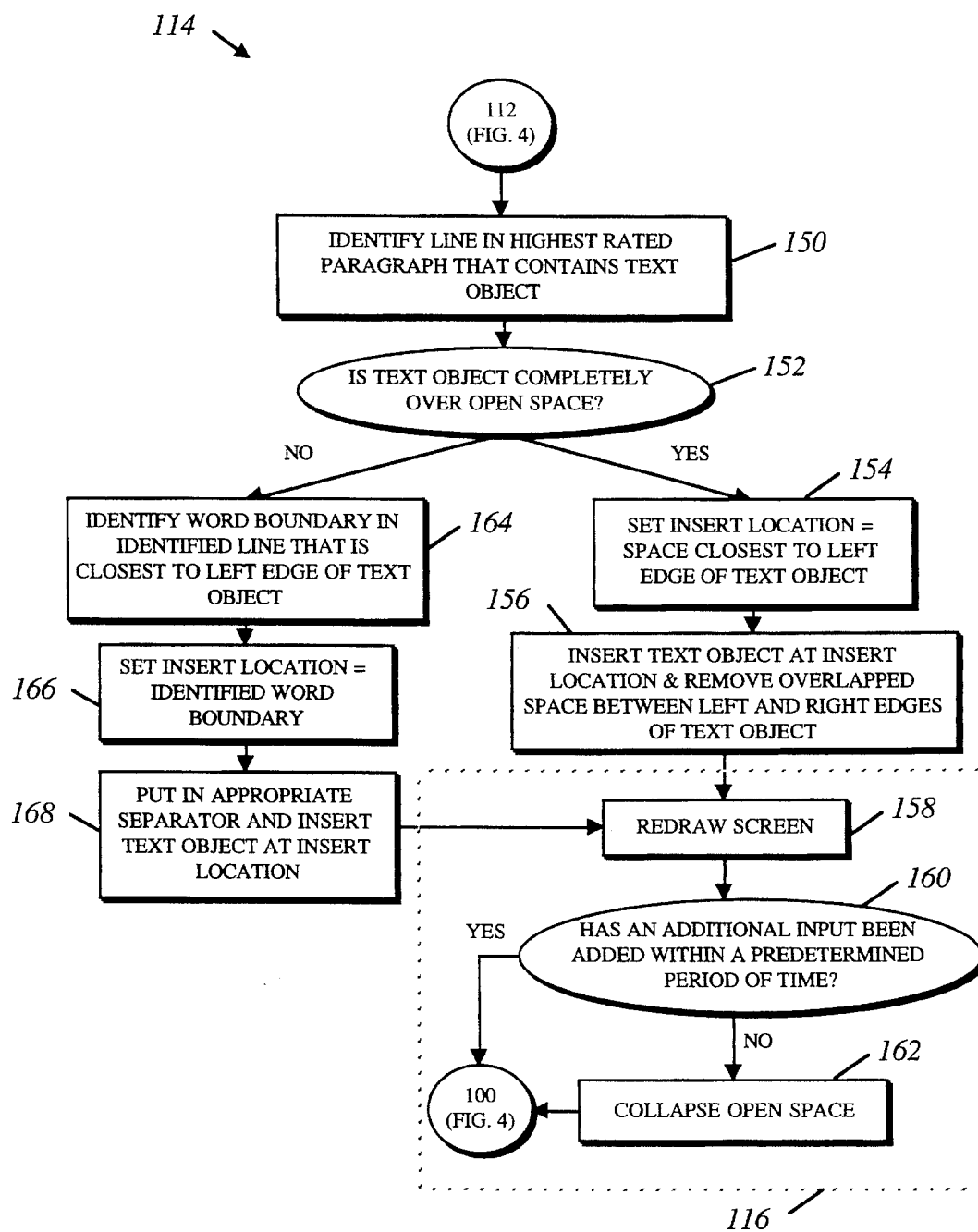
FIG. 6 is a flow diagram of a suitable process for determining an insertion location within a best matched paragraph (step 114 of FIG. 4)

Referring next to FIG. 6, a flow diagram showing the steps involved in determining the insert location within the best matched paragraph for inserting the text object (step 114 of FIG. 4) will be described. The process begins in step 150 with the identification of the line within the paragraph that contains the text object. This line location is found by going down through each line of the paragraph starting from the top or first line and identifying the line within the paragraph that contains at least fifty percent of the text object. When there is no one line that contains at least fifty percent of the text object, such as when the input strokes are so large as to go across several lines within the existing paragraph so that no one line has a majority of the text object, the last line of the paragraph is the identified line for insertion. As an example, the inked word "eleven" as shown in FIG. 6a is so large, it does not overlie any one line in the paragraph 151 by at least 50%, but it has been designated as a part of the paragraph, and therefore, the last line is the identified line for insertion. FIG. 6b illustrates paragraph 151 containing the recognized "eleven" at the end of the last line. Alternatively, the baseline of the inked strokes could be used in this step to identify the insertion line by determining which line within the paragraph contains the baseline.

Once a line has been identified, the process continues with step 152 to determine if the text object lies completely over open space. Open space may take the form of a series of spaces, a blank, or a set of spaces that have been inserted into an existing paragraph to provide a blank area for inserting text into an existing paragraph. By way of example, a space insertion gesture, such as that described in co-pending U.S. patent application Ser. No. 08/070,094, filed on May 27, 1993, pending, on behalf of Capps, et al., and entitled Deleting Objects on a Computer Display, which is herein incorporated by reference in its entirety, is an appropriate way of inserting open space into a paragraph. It is noted that in the described embodiment, tabs are not treated as open space. Rather they are treated as word with the left and right boundaries of the tab being considered the left and right word boundaries. However, in alternative embodiments, it would be possible to consider tabs as open space.

If the text object does lie completely within this open space, the process proceeds to step 154 in which the insert location is set to the space within the open space that is closest to the left edge of the text object. Once the insert location is established, the text object is inserted at the insert location and the spaces that the text object overlies within the open space are removed in step 156. By removing the spaces that the recognized text object overlies within the open space, the text following the inserted text object within the paragraph is not displaced by that number of spaces.

After removing the spaces, the process then continues with step 158 and the redrawing of the screen before proceeding to step 160 to determine if an additional input has occurred within a predetermined period of time. An appropriate amount of time for this predetermined period is in the range of 1 to 2 seconds. When an input has occurred, the process returns to step 100 to identify the insert location for the input. When no input has occurred within this time period, the process continues with step 162 in which the remaining extra space to the right and left of the text object is removed, i.e., the open space collapses about the inserted text object to a single space on each side of the text object. The logic then proceeds to step 100. As an example of steps 154–162, FIGS. 6c–6e illustrate insertion into an open space. As seen in FIG. 6c, the word "two" has been entered within an open space. FIG. 6d shows the placement of the recognized "two" into the open space at the space closest to the left edge of the input "two" while preserving the same remaining white space. As seen in FIG. 6e, when no new input is entered in the open space within the predetermined time period, the extra spaces between the recognized "two" and the words "one" and "three" are removed. Of course, a single space is left between the words to separate them.

When the result of step 152 is negative, the text object is not within an open space, and the process continues with step 164 to identify the insert location within the identified line. In step 164, a word boundary within the identified line that is closest to the left edge of the text object is identified. In step 166, the insert location is set to this identified word boundary. As indicated above, in the described embodiment, tabs are treated as words having left and right boundaries. Thus, if the closest word boundary to the left edge of the text object is the boundary of a tab, the insert location will be set at the tab boundary. In step 168, an appropriate separator, either a carriage return or space, is established for carriage return is an appropriate separator if the current text input is below the preceding text input, there are at least 100 pixels of empty space between the recognized preceding text object and the right margin, and the width of the bounds of the text input strokes plus an additional appropriate amount of space, e.g., 10 pixels, which allows for word separation, is less than the empty space. A carriage return is also appropriate if the strokes of the current text input have been entered below the preceding text input, there are at least 100 pixels of empty space between the preceding text object's input strokes and the right margin, and the width of the bounds of the current strokes plus an additional appropriate amount of space, e.g., 10 pixels, which allows for word separation, is less than the empty space between the last stroke of the preceding text input and the right margin. Preceding in these cases is again referring to preceding in time, and the 100 pixel designation has been found to work well for a screen with a 240 pixel width, so that adjustments to this value may be needed for screens having a different width. In either case, because the space following the preceding text would have been sufficient for the input of the succeeding text, the indication is that a list of items is being entered, and thus, a carriage return is the separator between the text objects. If either case is not true, a space is the appropriate separator. Of course, similar determinations could also be made to establish a tab as the separator.

An example of steps 164–168 is shown in FIGS. 6f–6h. In FIG. 6f, a paragraph 169 comprises the words "one two four". An input of the word "three" is then performed between the recognized "two" and "four" of paragraph 169, as illustrated in FIG. 6g. The left edge of the input "three" is closest to the recognized word "two", and therefore, the designated word insertion location for the recognized word "three" is after the "two". The appropriate separator in this case is a space, and the "three" is inserted as illustrated in FIG. 6h.

After designating the insertion location, the process then returns to step 158 for the redrawing of the screen. This includes the reflowing of the text within the paragraph to include the text object while maintaining the appropriate conditions, i.e., the margins, tabs, justification, etc., as set for the paragraph in the system. By way of example, an appropriate reflowing process is disclosed in above-referenced co-pending U.S. patent application Ser. No. 08/070,096, now U.S. Pat. No. 5,479,596, issued Dec. 26, 1995. As seen in FIG. 3c, the words "four five six" have been inserted after the word "three" because the margins allowed the insertion to occur on the same line. Conversely, the margin size restricted the insertion of the word "seven" after the word "six" on the same line, and it is therefore inserted on the next line, as shown in FIG. 3d, with the same left edge as the word "one" so that the left margin for the paragraph is maintained. Once step 158 is concluded, the logic proceeds to step 160 to determine if an additional input has occurred within a predetermined period of time. Again, an appropriate amount of time for this predetermined period is in the range of 1 to 2 seconds. When an input has occurred, the process returns to step 100 to identify the insert location for the input. When no input occurs, any open space that is uncollapsed, such as when a previous input is in open space, is then collapsed in step 162 before the process returns to step 100 and the system is ready for the next user input.

Although only one embodiment of the present invention has been described in detail, it should be understood that the present invention may be embodied in many other specific forms without departing from the spirit or scope of the invention. Particularly, the invention has been described in the context of a writing style which flows from left to right and top to bottom. Of course, the invention is equally applicable to other writing styles such as Arabic writing which has a right to left and top to bottom writing flow, and Chinese or Japanese writing which have top to bottom, right to left writing flows. In such systems the frame of reference of the lines would be somewhat different, but the logic would of course be the same. For example, in the described embodiment, the top edge is the leading edge and the top line is the leading line of a paragraph. The side margins are to the left and right of the paragraph and the following line is below the paragraph. In contrast, in a writing system that flows top to bottom, right to left, right edge would be the leading edge, and the following line would be a vertical line to the left of the "paragraph". The side margins would be the top and bottom sides. Of course, other writing systems are contemplated as well. Therefore, the present examples are to be considered as illustrative and not restrictive, and the invention is not to be limited to the details given herein, but may be modified within the scope of the appended claims.

We claim:

1. A method for inserting text into a pen-based computer system, the method comprising the steps of:

receiving input strokes inputted by a stylus onto a screen of the pen-based computer system;

determining whether said input strokes comprise a text object;

examining each existing displayed paragraph in an active portion of said screen to determine whether said text object is associated with an existing paragraph when said input strokes are determined to be a text object and assigning a rating to each existing paragraph to identify a level of probability that said text object is associated with that existing paragraph;

forming a new paragraph with said text object when, based upon the examining step, said text object is determined not to be associated with any of said existing paragraphs; and determining an insert location within a highest rated existing paragraph when, based upon the examining step, said text object is determined to be associated with an existing paragraph and inserting said text object at said insert location.

2. A method as recited in claim 1 further comprising the substep of identifying a line within said highest rated existing paragraph containing said text object when said insert location is identified within said highest rated existing paragraph.

3. A method as recited in claim 2 further comprising the substep of determining whether said text object substantially completely overlies open space within said identified line.

4. A method as recited in claim 3 further comprising the substeps of:

setting said insert location to a space character within the open space that is closest to a leading edge of said text object when said text object does substantially completely overlie open space;

removing space characters in the open space that are positioned between the leading edge and a trailing edge of the text object and equal in width to the width of said text object.

5. A method as recited in claim 3 wherein when said text object does not substantially completely overlie open space, the method further comprises placing an appropriate separator before a leading edge of said text object in said identified line, and inserting said text object after said separator.

6. A method as recited in claim 1 further comprising the step of redrawing said screen after said text object is inserted at said insert location.

7. A method as recited in claim 1 wherein said highest rated existing paragraph is determined by comparing the probability levels assigned to each of the existing paragraphs.

8. A method as recited in claim 7 wherein when at least two existing paragraphs have the same probability level, the first existing paragraph to be assigned the probability level is the highest rated existing paragraph.

9. A method for inserting text into a pen-based computer system, the method comprising the steps of:

receiving input strokes inputted by a stylus onto a screen of the pen-based computer system;

determining whether said input strokes comprise a text object;

examining each existing displayed paragraph in an active portion of said screen to determine whether said text object is associated with an existing paragraph when said input strokes are determined to be a text object and assigning a rating to each existing paragraph to identify a level of probability that said text object is associated with that existing paragraph, wherein said step of examining further comprises the substeps of, determining whether a baseline of said text object is beyond a leading edge of a bounding box of an existing paragraph, determining whether a designated percentage of said text object is within the bounding box of said existing paragraph, and wherein when the baseline of said text object is beyond the leading edge of the bounding box and the designated percentage of the text object is within the bounding box, a determination is made that there is a first level probability that said insert location is within said existing paragraph;

forming a new paragraph with said text object when said text object is determined not to be associated with any of said existing paragraphs: and determining an insert location within a highest rated existing paragraph when said text object is determined to be associated with an existing paragraph and inserting said text object at said insert location.

10. A method as recited in claim 9 wherein when the first level probability determination is not made for said existing paragraph, said step of examining further comprises the substep of determining whether said text object substantially overlaps a last line of said existing paragraph, wherein when the text object does substantially overlap the last line of said existing paragraph, a determination is made that there is a second level probability that said insert location is within said existing paragraph.

11. A method as recited in claim 10 wherein the first and second level probabilities are treated as equal in said examining step.

12. A method as recited in claim 10 wherein when said second level probability determination is not made, said step of examining further comprises the substep of determining whether said text object lies within a predetermined distance of a side margin of said existing paragraph, wherein when said text object does not lie within said predetermined distance, a determination is made that there is a third level probability that said insert location is within said existing paragraph.

13. A method as recited in claim 12 wherein when the third level probability determination is not made, the step of examining further comprises the substep of determining whether said text object has been input substantially immediately following a preceding input on a same line, wherein when said text object does substantially immediately follow said preceding input on the same line, a determination is made that there is a fourth level probability that said insert location is within said existing paragraph.

14. A method as recited in claim 13 wherein when the fourth level probability determination is not made, the step of examining further comprises the substep of determining whether said text object is input on a line immediately following a line which contains said preceding input, wherein when said text object does follow on the line immediately below said preceding input, a determination is made that there is a fifth level probability that said insert location is within said existing paragraph.

15. A method as recited in claim 14 wherein when said fifth level probability is not determined, said step of examining further comprises the substep of determining whether said text object lies on a blank line following said existing paragraph, wherein when said text object does lie on said blank line, there is a sixth level probability that said insert location is within said existing paragraph.

16. A method as recited in claim 15 wherein said fifth and sixth levels of probability are treated as equal in said examining step.

17. A method as recited in claim 15 wherein when said sixth level probability determination is not made, said step of examining further comprises the substep of determining whether a designated percentage of said text object is within extended side margins of said existing paragraph, wherein when said designated percentage of said text object is within the designated margin, a determination is made that them is a seventh level probability that said insert location is within said existing paragraph.

18. A method as recited in claim 17 wherein when said seventh level probability is not determined, there is an eighth level probability that said insert location is within said existing paragraph.

19. A method as recited in claim 18 wherein said third and eighth levels of probability are treated as equal in said examining step.

20. A method as recited in claim 19 wherein said eighth level of probability is the lowest level of probability.

21. A method as recited in claim 20 wherein said first level probability is the highest level of probability.

22. A method as recited in claim 9 wherein said designated percentage is fifty percent.

23. A method for inserting text into a pen-based computer system, the method comprising the steps of:

determining a best matched paragraph for a text object input with a stylus on a screen of said pen-based computer system based at least in part on the location of a baseline of the text object;

identifying a line within said best matched paragraph when there is a determined best matched paragraph based at least in part on the location of the baseline;

determining whether said text object substantially completely overlies open space within said identified line;

setting an insert location on the identified line based on a leading edge of said text object; and inserting said text object at said insert location.

24. A method as recited in claim 23 wherein when said text object does substantially completely overlie open space, said insert location is a space character within the open space.

25. A method as recited in claim 23 further comprising the substep of forming a new paragraph with said text object when there is no determined best matched paragraph, the insert position of the new paragraph being based at least in part on the location of the baseline.

26. A method for inserting text into a pen-based computer system, the method comprising the steps of:

determining a best matched paragraph for a text object input with a stylus on a screen of said pen-based computer system;

identifying a line within said best matched paragraph when there is a determined best matched paragraph:

determining whether said text object substantially completely overlies open space within said identified line;

setting an insert location on the identified line based on a leading edge of said text object;

inserting said text object at said insert location; and wherein when said text object does not substantially completely overlie open space, the method further comprises placing an appropriate separator before said leading edge in said identified line, and inserting said text object after said separator.

27. A method for inserting text into a pen-based computer system, the method comprising the steps of:

determining a best matched paragraph for a text object input with a stylus on a screen of said pen-based computer system;

identifying a line within said best matched paragraph when there is a determined best matched paragraph:

determining whether said text object substantially completely overlies open space within said identified line;

setting an insert location on the identified line based on a leading edge of said text object;

inserting said text object at said insert location; and wherein when said text object does substantially completely overlie open space, the method further comprises removing space characters within the open space that are positioned between the leading edge and a trailing edge of the text object, the removed space characters being equal in width to the width of said text object.

28. A method for inserting text into a pen-based computer system, the method comprising the steps of:

determining a best matched paragraph for a text object input with a stylus on a screen of said pen-based computer system;

identifying a line within said best matched paragraph when there is a determined best matched paragraph and setting an insert location on the identified line based on a leading edge of said text object;

forming a new paragraph with said text object when there is no determined best matched paragraph and identifying an insert location for said new paragraph based on a baseline and leading edge of input strokes forming the text object, wherein when a guideline is present and said baseline is within a predetermined distance of said guideline, said new paragraph is inserted on said guideline at said leading edge: and inserting said text object at said insert location.

29. A method as recited in claim 28 wherein when said guideline is not present, said new paragraph is inserted on said baseline at said leading edge.

30. A method as recited in claim 29 further comprising the step of redrawing said screen after said text object is inserted at said insert location.

31. A method as recited in claim 30 further comprising the step of determining whether said text object substantially completely overlies open space within said identified line when there is a determined best matched paragraph wherein when said text object does substantially completely overlie open space, said step of redrawing further comprises removing extra spaces within said open space between said text object and existing text within said existing paragraph when no new text object has been input within a predetermined time period.

32. A computer system including a processing means for controlling operation of said computer system, a touch-sensitive display screen, a stylus for inputting data to said processing means by engaging said stylus with said screen and moving said stylus across said screen, said computer system comprising:

means for receiving strokes made with said stylus on said screen;

means for determining whether said strokes comprise a text object;

means for rating a plurality of existing paragraphs displayed on an active portion of said screen when said strokes comprise a text object to determine whether an association exists between said text object and said existing paragraphs;

means for determining an insert location for said text object wherein when it is determined that there is an association between the text object and at least one of the existing paragraphs the insert location is within one of the existing paragraphs and when it is determined that no association exists between the text object and the existing paragraphs, the insert location is not within one of the existing paragraphs; and means for inserting said text object at said insert location.

33. A computer system as recited in claim 32 wherein said means for rating assigns a probability level to each of said plurality of existing paragraphs, said probability level indicating the probability that said insert location is within each of said existing paragraphs.

34. A computer system as recited in claim 33 wherein when said means for rating determines that said text object is not associated with an existing paragraph, said means for determining an insert location identifies a location for a new paragraph as said insert location.

35. A computer system as recited in claim 33 further comprising means for comparing the probability level of each existing paragraph to determine a most probable paragraph containing said insert location.

36. A computer system as recited in claim 35 wherein when said means for comparing determines a most probable paragraph, said means for determining an insert location identifies a line within said most probable paragraph for said insert location.

37. A computer system as recited in claim 36 wherein said means for determining an insert location identifies a location based on a leading edge of said text object within said line as said insert location.

* * * * *